(12) United States Patent
Shirayanagi et al.

(10) Patent No.: US 6,631,988 B2
(45) Date of Patent: Oct. 14, 2003

(54) DESIGNING AND MANUFACTURING METHODS OF SPECTACLE LENS, AND SPECTACLE LENS SERIES

(75) Inventors: Moriyasu Shirayanagi, Saitama-ken (JP); Yoshimi Obara, Tokyo (JP)

(73) Assignee: Pentax Corporation, Tokyo (JP)

( * ) Notice: Subject to any disclaimer, the term of this patent is extended or adjusted under 35 U.S.C. 154(b) by 102 days.

(21) Appl. No.: 09/899,035

(22) Filed: Jul. 6, 2001

(65) Prior Publication Data

US 2002/0018178 A1 Feb. 14, 2002

(30) Foreign Application Priority Data

Jul. 7, 2000 (JP) ........................................ 2000-206720

(51) Int. Cl.$^7$ ................................................ G02C 7/02
(52) U.S. Cl. ........................................ 351/177; 351/159
(58) Field of Search ................................ 351/159, 176, 351/177

(56) References Cited

U.S. PATENT DOCUMENTS

| | | |
|---|---|---|
| 3,960,442 A | 6/1976 | Davis et al. |
| 4,181,409 A | 1/1980 | Whitney et al. |
| 5,050,979 A | 9/1991 | Shinohara |
| 5,050,980 A | 9/1991 | Shinohara |
| 5,137,344 A | 8/1992 | Kagei .................. 351/177 |
| 5,353,072 A | 10/1994 | Tejima et al. |
| 5,550,600 A | 8/1996 | Ueno |
| 5,610,670 A | 3/1997 | Ueno |
| 6,089,710 A | 7/2000 | Zeidler |
| 6,193,370 B1 | 2/2001 | Shirayanagi |
| 2002/0039171 A1 * | 4/2002 | Shirayanagi et al. ........ 351/159 |

FOREIGN PATENT DOCUMENTS

| | | |
|---|---|---|
| EP | 0209917 | 1/1987 |
| EP | 880046 | 11/1998 |
| FR | 2777668 | 10/1999 |
| GB | 2362347 | 11/2001 |
| JP | 10175149 | 6/1998 |
| WO | 93/12452 | 6/1993 |

OTHER PUBLICATIONS

English Language Abstract for JP Appln. 10–175149.
An article entitled "World's first both–sides aspherical single focus lens 'Seiko Super Sovereign AZ' made by Seiko Optical Products will be marketed Oct. 1", General Technical Journal of Eyewear, GANKYO, published Sep., 1998, pp. 182–183 col. 3, line 13, along with a full English language translation of the same.

* cited by examiner

*Primary Examiner*—Scott J. Sugarman
(74) *Attorney, Agent, or Firm*—Greenblum & Bernstein, P.L.C.

(57) ABSTRACT

Disclosed is a manufacturing method of a spectacle lens. The entire range of available vertex power of a spectacle lens is divided into a plurality of sections, and at least one type of semifinished lens blank whose front surface is finished is prepared for each of the sections. On the basis of required specification, one type of the semifinished lens blank is selected. Further, an aspherical shape design for processing the back surface of the selected semifinished lens blank is determined according to the required specification. The aspherical shape of the back surface is optimized such that average power errors or astigmatisms of the finished lenses having different vertex powers within the same section are approximately balanced. Finally the back surface is processed based on the determined aspherical shape.

20 Claims, 19 Drawing Sheets

DESIGNING AND MANUFACTURING METHODS OF SPECTACLE LENS, AND SPECTACLE LENS SERIES

BACKGROUND OF THE INVENTION

The present invention relates to designing method, a manufacturing method of a spectacle lens to correct eyesight, and a spectacle lens series.

In general, a spectacle lens is custom-made to meet the customer's specification. However, it takes long time to process both front and back surfaces after receiving the customer's order. Therefore, semifinished lens blanks whose front surfaces are finished are stockpiled and a back surface of the selected semifinished lens blank is processed according to the customer's specification in order to shorten delivery times. Further, the entire range of available vertex power of a spectacle lens is divided into about ten sections, and one type of the semifinished lens blank is prepared for each of the sections.

Aspherical spectacle lenses whose at least one of the front and back surfaces is aspherical have come into wide use. When the spectacle lens employs an aspherical surface, the base curve becomes slower (i.e., the absolute value of the front vertex power decreases) and the maximum thickness becomes shorter as compared with a spherical lens whose both of the front and back surfaces are spherical. A conventional semifinished lens blank prepared for an aspherical spectacle lens has an aspherical finished front surface. A back surface thereof will be processed to be spherical or toric to meet the customer's specification.

FIGS. 17A through 17C show a sample of the sections of the vertex power, FIG. 17A shows a range of minus diopter, FIG. 17B shows a range of plus diopter and FIG. 17C shows a range of mixed diopter. The entire range of the available vertex power, which is a combination of a spherical power SPH and a cylindrical power CYL, is divided into nine sections I through IX. Unit of each of powers is diopter and that is indicated by "D" in the following description. One type of the semifinished lens blank is prepared for each of the sections. The relationship between the sections and the base curves of the semifinished lens blank is shown in TABLE 1.

TABLE 1

| Section | Base curve(D) | Section | Base curve(D) |
|---|---|---|---|
| I | 0.50 | VI | 5.00 |
| II | 1.25 | VII | 6.00 |
| III | 2.00 | VIII | 7.00 |
| IV | 3.00 | IX | 8.00 |
| V | 4.00 | — | — |

FIG. 18 shows surface powers of the front surfaces D1m(h) (unit: diopter) of the semifinished lens blanks prepared for the respective sections I to IX at the point whose distance from the optical axis of said finished lens is h (unit: mm) in a plane that contains the optical axis.

The sections of the vertex power are determined such that optical performances of the finished lenses that have the same front surface shape fall in an allowable range for every vertex power within the specific section. For instance, in the section II, which covers SPH −5.25 D to −7.00 D and CYL 0.00 D to −2.00 D, the common aspherical surface whose base curve is 1.25 D is employed as the front surface and the back surface is processed to be a spherical surface whose surface power is −7.25 D when the required vertex power is SPH −6.00 D and CYL 0.00 D. Further, when the required vertex power is SPH −7.00 D and CYL −2.00 D, the back surface is processed to be a toric surface whose minimum and maximum surface powers are −8.25 D and −10.25 D, respectively.

According to the conventional designing and/or manufacturing method, when the required vertex power is at the center of each section, an optical performance of the spectacle lens can be kept high. However, when the required vertex power is in periphery of each section, the optical performance is degraded.

For example, FIG. 19 shows graphs of astigmatisms with respect to the visual angle β of the spectacle lenses whose required vertex powers are SPH +3.25 D and +4.00 D that are in periphery of the section VIII. The section VXII covers SPH +3.25 D to +4.00 D and CYL 0.00 D to +2.00 D, the front surface of the semifinished lens blank prepared for this section is an aspherical surface whose base curve is +7.00 D. In each graph a solid line represents the astigmatism $AS_\infty$ for infinite object distance and a dotted line represents the astigmatism $AS_{300}$ for object distance 300 mm. As shown in FIG. 19, the astigmatism $AS_{300}$ is significant for the spectacle lens whose vertex power is SPH +3.25, while the astigmatism $AS_\infty$ is significant for the spectacle lens whose vertex power is SPH +4.00. Namely, the astigmatisms of the finished lenses (SPH +3.25 and SPH +4.00) are not balanced.

FIG. 20 shows average power error $AP_\infty(30)$ at 30° of visual angle for infinite object distance, astigmatism $AS_\infty(30)$ at 30° of visual angle for infinite object distance, and astigmatism $AS_{300}(30)$ at 30° of visual angle for the object distance 300 mm of the spectacle lens series designed and manufactured by the conventional method within the entire range of vertex power SPH −8.00 D to +5.00 D. As shown in FIG. 20, the aberrations significantly vary in each section and the degradations stand out at boundaries of the sections.

SUMMARY OF THE INVENTION

It is therefore an object of the present invention to provide a design method and a manufacturing method, which are capable of designing and manufacturing a spectacle lens having good optical performance for every vertex power.

For the above object, according to the designing method of the present invention, the entire range of available vertex power of a spectacle lens is divided into a plurality of sections, at least one type of semifinished lens blank whose one of the front and back surfaces is finished is prepared for each of the sections, one type of the semifinished lens blank is selected according to a required specification, and then an aspherical shape design for processing the unfinished surface of the selected semifinished lens blank is determined to be optimized for the required specification. The specification includes the vertex power and so on.

With this method, since the aspherical shape design for processing the unfinished surface of the lens blank is determined based on the required specification, a degree of flexibility in surface design becomes higher than the conventional method (an unfinished back surface of a lens blank whose front surface is finished as an aspherical surface is processed as a spherical or totic surface), which increases the optical performance of the finished lens regardless of whether the required vertex power is in the periphery in the specific section or in the center thereof.

In the following description, the surface of the finished lens that corresponds to the finished surface of the semifinished lens blank is referred to as a common surface that is common in the same section and the other surface of the finished lens that corresponds to the unfinished surface of the semifinished lens blank is referred to as a custom surface that is custom-made according to the required specification.

Further, the aspherical shape of the custom surface is optimized such that any pair of the finished lenses that have different vertex powers within the same section preferably satisfy the following condition (1) for at least one height h within the range of 0<h<15:

$$\Delta D1m(h)_i + \Delta D2m(h)_i \neq \Delta D1m(h)_j + \Delta D2m(h)_j \quad (1)$$

where

D1m(h) and D2m(h) are surface powers of the front and back surfaces (unit: diopter) at the point whose distance from the optical axis of said finished lens is h (unit: mm) in a plane that contains said optical axis, $\Delta D1m(h)$ is a variation of surface power of the front surface and is obtained by $D1m(h)-D1m(0)$, $\Delta D2m(h)$ is a variation of surface power of the back surface and is obtained by $D2m(h)-D2m(0)$, and the subscripts "i" and "j" represent the values of the finished lenses that have different vertex powers within the same section.

The condition (1) means $\Delta D2m(h)_i \neq \Delta D2m(h)_j$ when the front surface is a common surface. On the other hand, when the back surface is a common surface, the condition (1) means $\Delta D1m(h)_i \neq \Delta D1m(h)_j$. In this manner, the variations of the surface powers of the custom surfaces are different from each other, which results in the spectacle lens having the optimum optical performance for every vertex power.

While the common surface may be either the front surface or the back surface, the front surface is preferably formed as the common surface to ease the manufacturing. It is preferable that the semifinished lens blank whose front surface is finished is prepared for each of the sections and the back surface is processed according to the required specification. That is, the following condition (2) is preferably satisfied:

$$D1m(h)_i = D1m(h)_j. \quad (2)$$

When the front surface is formed as the common surface, it may be a spherical surface or a rotationally-symmetrical aspherical surface. In order to reduce the manufacturing cost, the front surface should be a spherical surface as defined in the following condition (3):

$$D1m(h)_i = D1m(h)_j = D1m(0)_i = D1m(0)_j. \quad (3)$$

When the front surface is an aspherical common surface, the semifinished lens blanks described in the prior art can be employed. In either case, the aspherical shape of the back surface is determined such that the finished lens has the optimum optical performance.

Further, the aspherical shape of the custom surface preferably determined such that the finished lens satisfies the following condition (4) when $P_i < P_j < -3.00$ and $h \leq 15$:

$$MAX(|\Delta D1m(h)_i + \Delta D2m(h)_i - \Delta D1m(h)_j - \Delta D2m(h)_j|) \leq 0.3 \quad (4)$$

where

P is a vertex power (unit: diopter); and

MAX( ) is a function that finds the maximum value in the specific section.

The condition (4) means that differences between the variations of the aspherical surface power of the finished minus lenses that have different vertex powers within the same section are not greater than 0.3 D when $h \leq 15$.

On the other hand, the aspherical shape of the custom surface preferably determined such that the finished lens satisfies the following condition (5) when $P_i > P_j > +2.00$:

$$\Delta D1m(15)_i + \Delta D2m(15)_i < \Delta D1m(15)_j + \Delta D2m(15)_j. \quad (5)$$

Since the value of $\Delta D1m(15) + \Delta D2m(15)$ is usually smaller than zero, the condition (5) means that the variation of the aspherical surface power increases as the plus vertex power becomes larger.

The aspherical shape of the custom surface is preferably optimized such that average power errors or astigmatisms of the finished lenses having different vertex powers within the same section are approximately balanced. Further, the aspherical shape of the custom surface is preferably optimized such that relationships between average power errors of astigmatisms of each finished lens within the same section are substantially the same.

For example, when the condition (6) is satisfied under $P_i < P_j$ and $\beta \leq 30$, the astigmatisms are well balanced.

$$-0.04 < \frac{AS_\infty(\beta)_i + AS_{300}(\beta)_i - AS_\infty(\beta)_j - AS_{300}(\beta)_j}{2(P_i - P_j)} < 0.04 \quad (6)$$

where $AS_\infty(\beta)$ is astigmatism (unit: diopter) at visual angle $\beta$ (unit: degree) for infinite object distance; and $AS_{300}(\beta)$ is astigmatism at visual angle $\beta$ for object distance 300 mm)

The condition (6) means that differences of average values of astigmatisms for infinite and finite object distances are approximately identical for any pair of the finished lenses having different vertex powers within the same section. The difference of the average values of astigmatism is preferably smaller than 0.01 D for a pair of the finished lenses whose vertex powers are different in 0.25 D within the same section.

According to further example, when the condition (7) is satisfied under $\beta \leq 30$, the astigmatisms are well balanced.

$$-0.01 < \frac{AS_\infty(\beta) + AS_{300}(\beta)}{2} < 0.1 \quad (7)$$

The condition (7) means that average values of astigmatisms for infinite and finite object distances for each finished lens falls in the range of ±0.1.

According to still further example, when the condition (8) is satisfied when $P_i < P_j$ and $\beta \leq 30$, the average power errors are well balanced.

$$-0.04 < \frac{AP_\infty(\beta)_i - AP_\infty(\beta)_j}{P_i - P_j} < 0.04 \quad (8)$$

where $AP_\infty(\beta)$ is average power error at visual angle $\beta$ (unit: degree) for infinite object distance.

The condition (8) means that differences of, average power errors for the infinite object distance are approximately identical for any pair of the finished lenses having different vertex powers within the same section. The difference of the average power error is preferably smaller than 0.01 D for a pair of the finished lenses whose vertex powers are different by 0.25 D within the same section.

According to yet further example, when the condition (9) is satisfied under $\beta \leq 30$, the average power errors are well balanced.

$$-0.1 < AP_\infty(\beta) < 0.1 \tag{9}$$

The condition (9) means that the average power error for the infinite object distance for each finished lens falls in the range of ±0.1.

On the other hand, the spectacle lens series according to the present invention includes a plurality of types of spectacle lenses that are different in vertex power. One of said front and back surfaces of each spectacle lens is predetermined for each of sections, which is defined to divide the entire range of available vertex power, the other surface is an aspherical surface determined for a required specification. Further, the condition (1) described above is satisfied. In such a case, the front surface may be the common surface and it may be a spherical surface.

DESCRIPTION OF THE ACCOMPANYING DRAWINGS

DESCRIPTION OF THE EMBODIMENTS

A designing method and a manufacturing method of a spectacle lens embodying the invention will be described with reference to the accompanying drawings. First, the outline of the invention is described with reference to FIGS. 1A and 1B, and then design examples (embodiments) will be described.

Figure 1A:
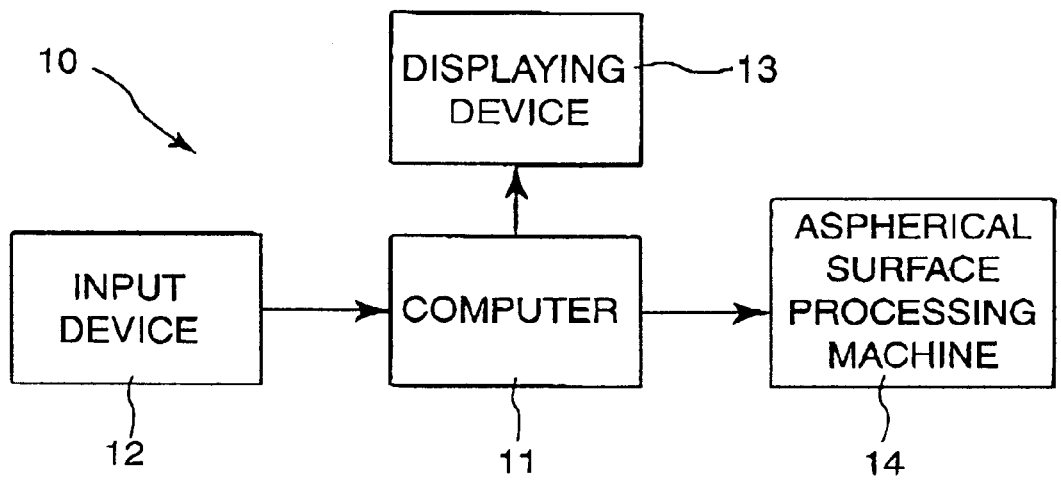
FIG. 1A is a block diagram showing a manufacturing system of a spectacle lens embodying the invention.
Figure 1B:
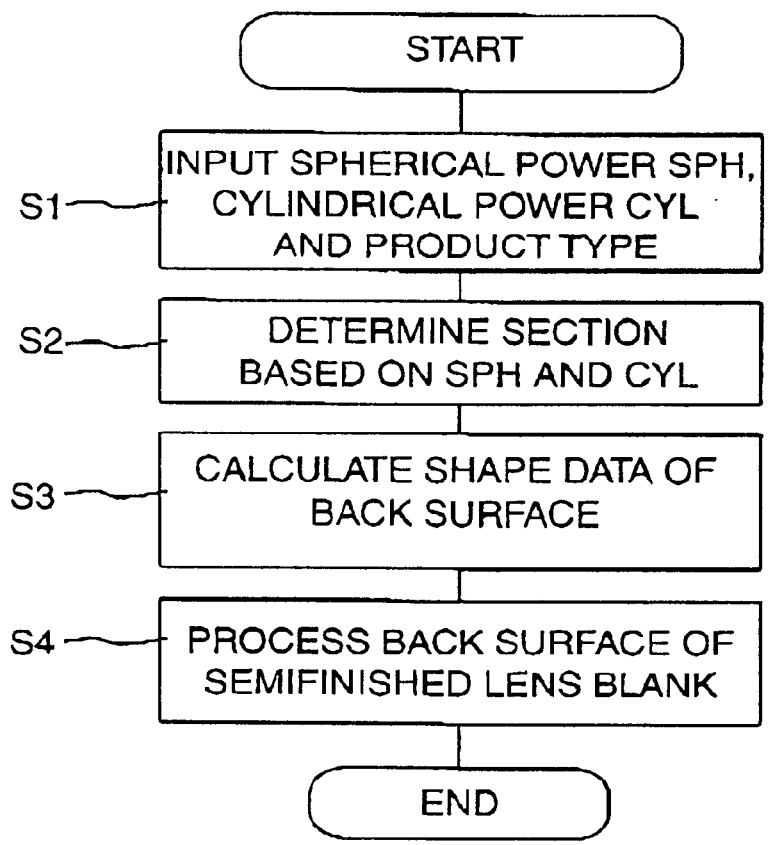
FIG. 1B is a flowchart showing a manufacturing method of a spectacle lens embodying the invention.

FIG. 1A is a block diagram showing the manufacturing system of a spectacle lens and FIG. 1B is a flowchart showing the manufacturing method embodying the invention.

As shown in FIG. 1A, the manufacturing system 10 of spectacle lenses is provided with a computer 11 on which a computer program discussed later is installed, an input device 12 such as a keyboard to input data to the computer 11, a display 13 such as CRT that is connected to the computer 11, and an aspherical surface processing machine 14 that is controlled by the computer 11.

When an order from a customer is received, a spectacle lens is manufactured in a manufacturing factory according to steps of FIG. 1B. In step S1, an operator inputs customer's data (i.e., specification of the required spectacle lens) to the computer 11 with the input device 12. The specification include a vertex power (a spherical power SPH and a cylindrical power CYL) and a product type that determines the refractive index of the lens material. The customer's data may be input to a terminal computer placed in an opticianry. In such a case, the customer's data is transmitted to the factory through a computer network.

Figure 17A:
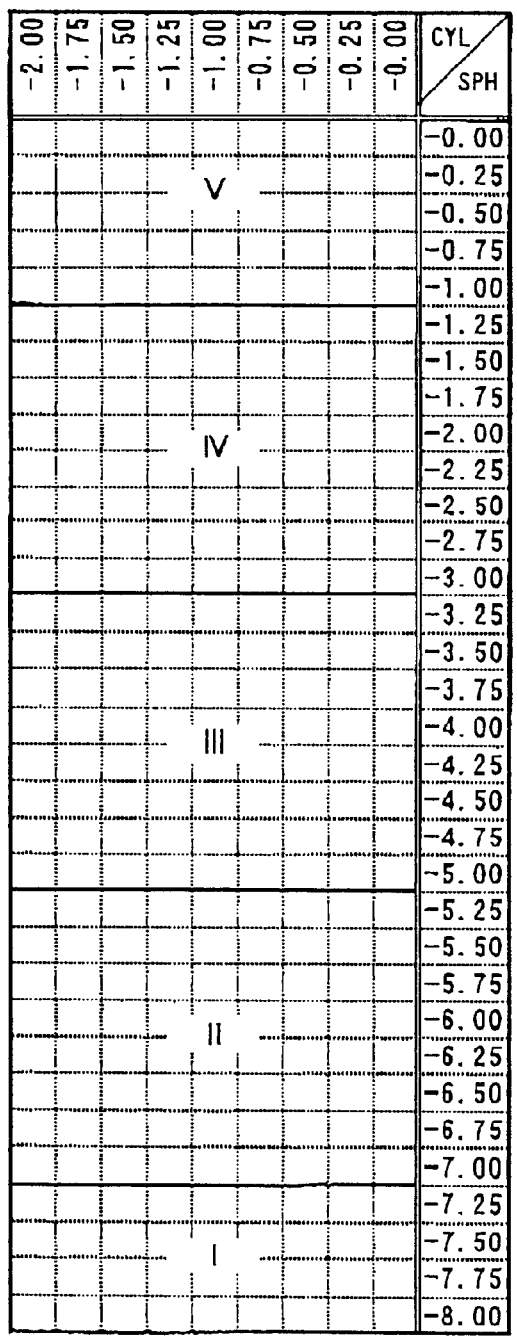
FIGS. 17A, 17B and 17C show the sections of the base curve for semifinished lens blanks that are common to the embodiments and the prior art.
Figure 17B:
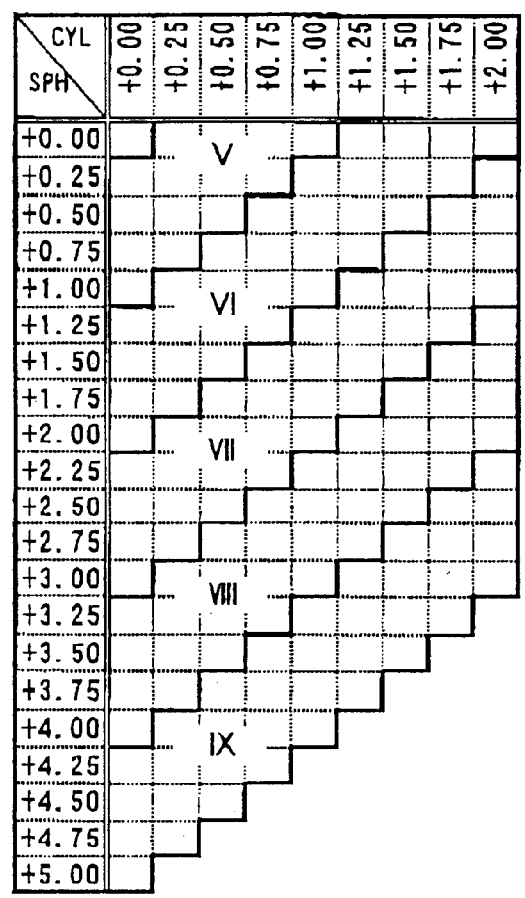
Figure 17C:
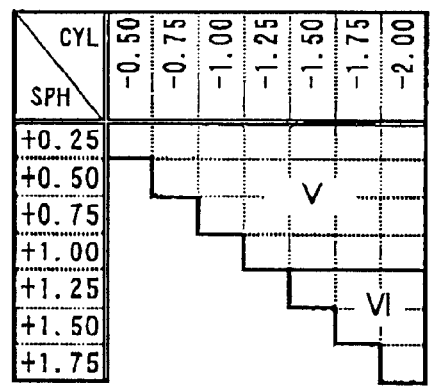

In step S2, the computer 11 determines a section of the vertex power based on the spherical power SPH and the cylindrical power CYL and selects the type of semifinished lens blank. The entire range of available vertex power of a spectacle lens is divided into nine sections I through IX as shown in FIGS. 17A through 17C and at least one type of semifinished lens blank is prepared for each section.

After the type of semifinished lens blank is selected, the computer 11 calculates the aspherical shape design for processing the unfinished back surface (the custom surface) based on the shape data of the front surface (the common surface) of the selected semifinished lens blank and the specification according to a calculating program in step S3. The calculating program finds the aspherical shape data of the back surface based on the shape data of the front surface as a precondition with an optimization algorithm such as a damping least squares method so as to optimize the optical performance while keeping the required specification. The processes of steps S2 and S3 correspond the design method of the present invention.

Next, the operator places the selected semifinished lens blank on the aspherical surface processing machine 14. After the placement, when the operator enters a start command from the input device 12, the computer 11 controls the aspherical surface processing machine 14 to process (grind) the unfinished back surface of the semifinished lens blank based on the aspherical shape data found in step S4.

Next, five embodiments of the spectacle lens series of the invention will be described. In any embodiments, a refractive index of the lens material is 1.6, a diameter of the finished lens is φ70 mm, the minimum thickness (the center thickness for a minus lens and the edge thickness for a plus lens) is 1.0 mm. The semifinished lens blank whose front surface is finished is prepared for each of sections I through IX. That is, the front surface is the common surface and the back surface is the custom surface. The base curves (the paraxial surface power, unit: diopter) of the semifinished lens blanks according to the respective embodiments are shown in TABLE 2. "Ex. 1" means the first embodiment for instance.

TABLE 2

| Section | Base Curve (unit: D) | | | | |
|---------|------|------|------|------|------|
|         | Ex. 1 | Ex. 2 | Ex. 3 | Ex. 4 | Ex. 5 |
| I       | 0.50 | 0.00 | 2.00 | 0.50 | 0.50 |
| II      | 1.25 | 0.50 | 3.00 | 1.25 | 1.25 |
| III     | 2.00 | 1.25 | 4.00 | 2.00 | 2.00 |
| IV      | 3.00 | 2.00 | 5.00 | 3.00 | 3.00 |
| V       | 4.00 | 3.00 | 6.00 | 4.00 | 4.00 |
| VI      | 5.00 | 4.00 | 7.00 | 5.00 | 5.00 |
| VII     | 6.00 | 5.00 | 8.00 | 6.00 | 6.00 |
| VIII    | 7.00 | 6.00 | 9.00 | 7.00 | 7.00 |
| IX      | 8.00 | 7.00 | 10.00 | 8.00 | 8.00 |

First Embodiment

Figure 2:
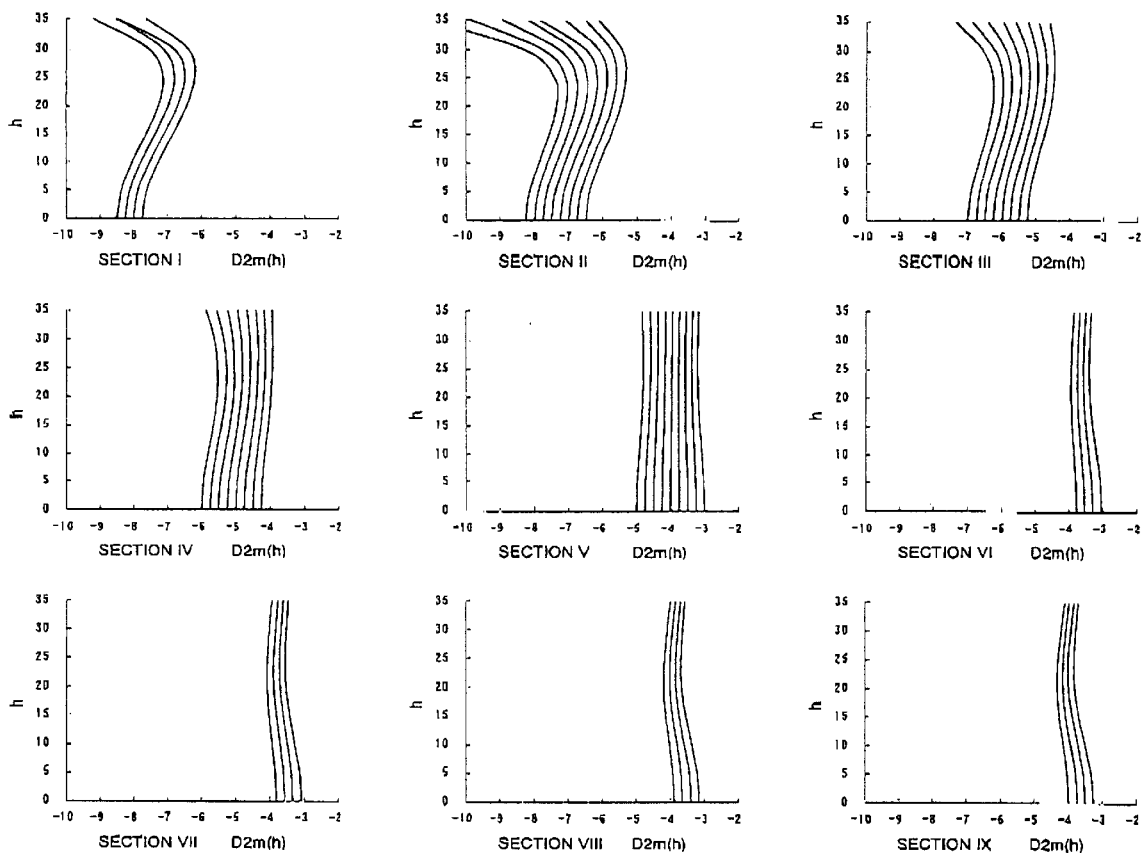
FIG. 2 shows graphs of back surface powers D2m(h) of finished lenses of respective sections in cross-section containing the optical axis according to a spectacle lens series of a first embodiment, each graph shows D2m(h) of the finished lenses for respective vertex powers in each section.

In a first embodiment, the front surface is a spherical surface that is common to the lenses in the specific section and the aspherical shape of the back surface is determined according to the required specification. The back surface powers D2m(h) of finished lenses in cross-section containing the optical axis according to the spectacle lens series of the first embodiment are shown in FIG. 2. Further the variations of the back surface power ΔD2m(h) that is obtained by D2m(h)−D2m(0) are shown in FIG. 3.

Figure 3:
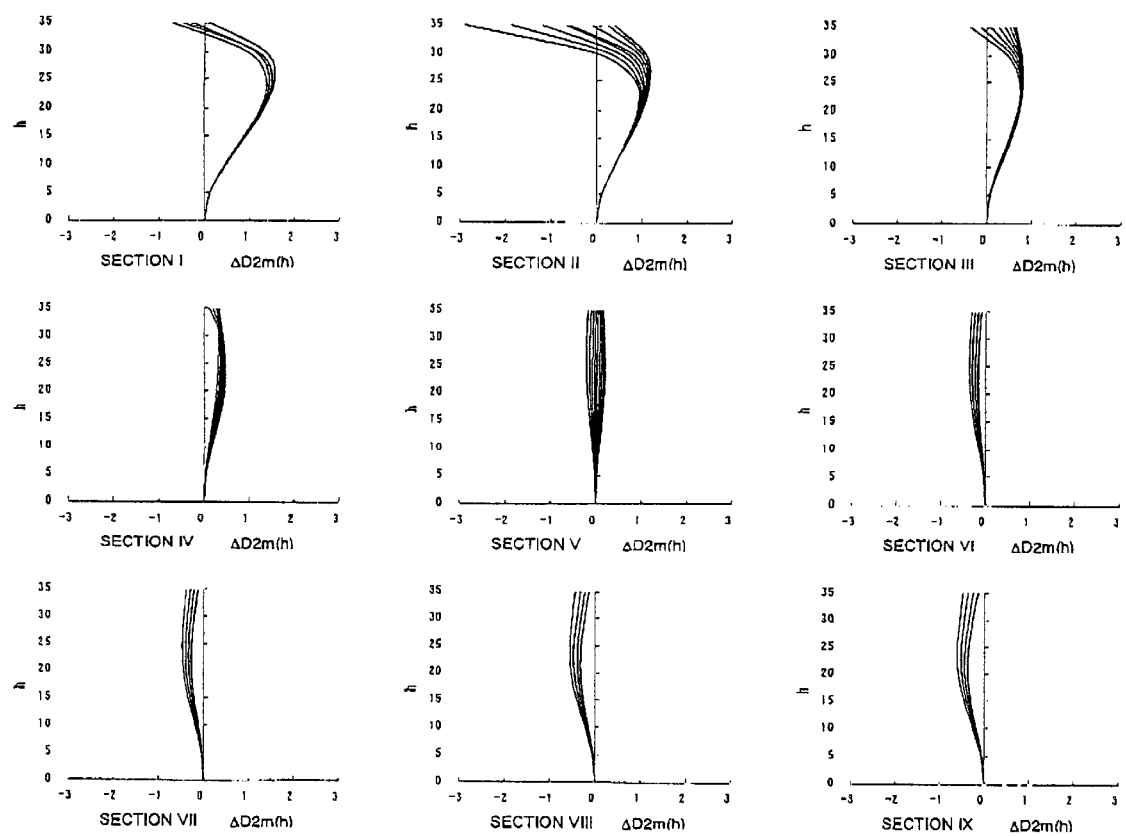
FIG. 3 shows graphs of variations of back surface powers ΔD2m(h) of finished lenses of respective sections in cross-section containing the optical axis according to the spectacle lens series of the first embodiment, each graph shows ΔD2m(h) of the finished lenses for respective vertex powers in each section.

FIGS. 2 and 3 show data of the spectacle lens series that includes the finished lenses whose spherical powers SPH are −8.00 D to +5.00 D and the cylindrical power CYL is zero. Fifty-three types of the finished lenses that correspond the rightmost squares in the matrix of FIG. 17A and the leftmost squares in the matrix of FIG. 17B are designed and the data thereof are indicated in FIGS. 2 and 3. For instance, the data of four types of finished lenses whose spherical powers are −8.00 D, −7.75 D, −7.50 D and −7.25 D are indicated for the section I.

With regard to the optical performance, the spectacle lens series of the first embodiment is designed such that the astigmatism for the infinite object distance and the astigmatism for the object distance 300 mm are well balanced.

Figure 4:
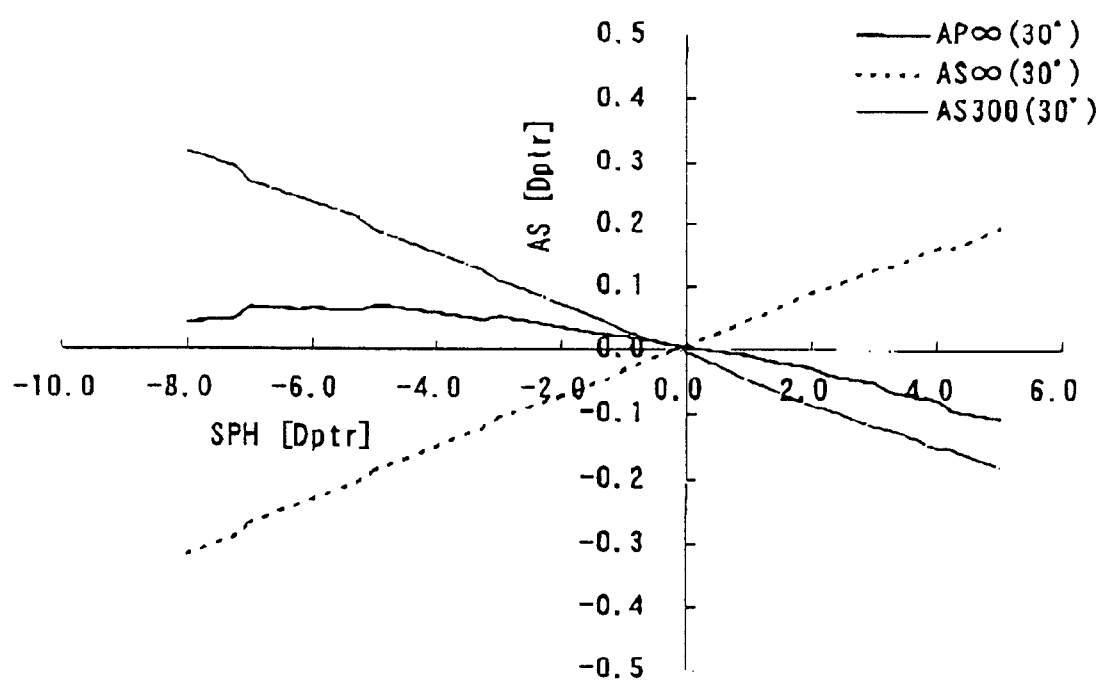
FIG. 4 is a graph showing optical performance of the spectacle lens series at 30 degrees in visual angle according to the first embodiment.

FIG. 4 shows average power error $AP_\infty(30)$ at 30° of visual angle for the infinite object distance, astigmatism $AS_\infty(30)$ at 30° of visual angle for the infinite object distance, and astigmatism $AS_{300}(30)$ at 30° of visual angle for object distance 300 mm of the spectacle lens series according to the first embodiment within the entire range of vertex power SPH −8.00 D to +5.00 D. As shown in FIG. 4, the variations of the aberrations within each section are reduced and the degradations at boundaries of the section are also reduced. The astigmatisms $AS_\infty(30)$ and $AS_{300}(30)$ are well balanced over the entire range of vertex power. Since it is difficult to reduce both of the astigmatisms $AS_\infty(30)$ and $AS_{300}(30)$ at the same time, because one of them increases as the other decreases, the astigmatisms are balanced such that the absolute values of the astigmatisms $AS_\infty(30)$ and $AS_{300}(30)$ are approximately identical.

Second Embodiment

Figure 5:
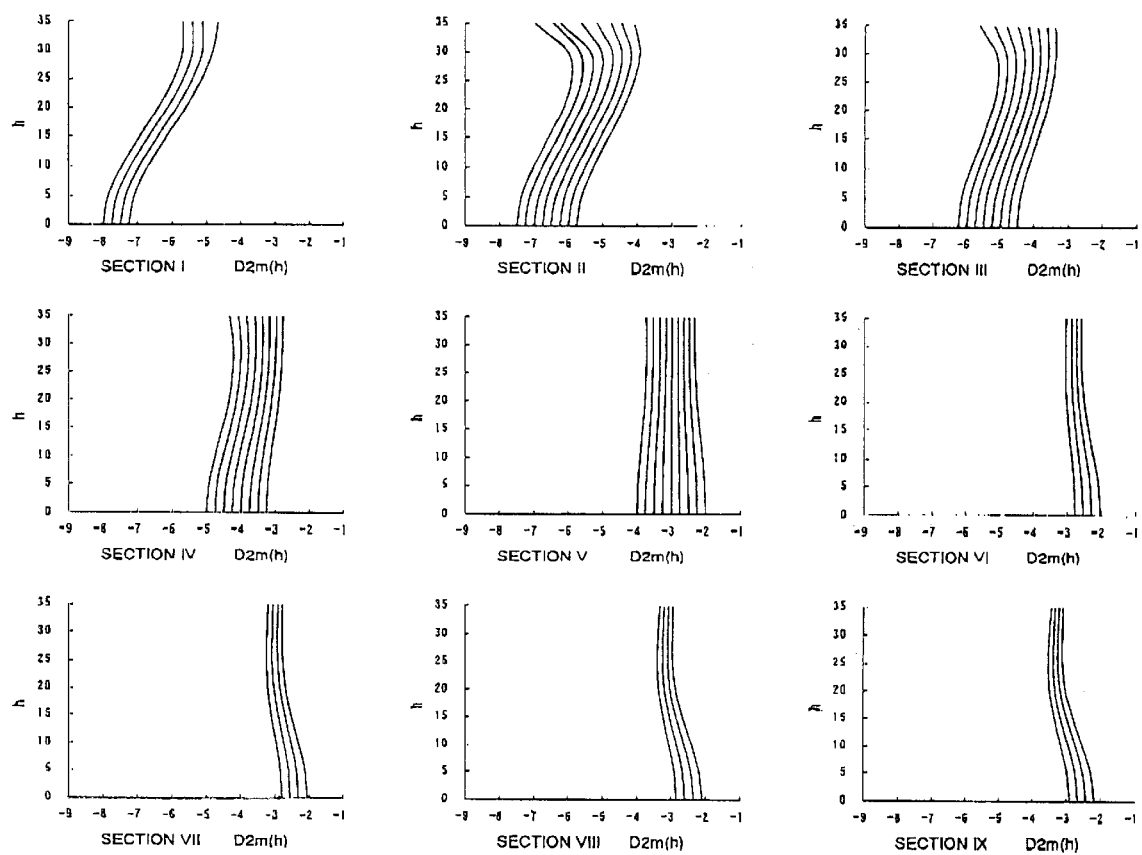
FIG. 5 shows graphs of back surface powers D2m(h) of finished lenses of respective sections in cross-section containing the optical axis according to the spectacle lens series of a second embodiment.
Figure 6:
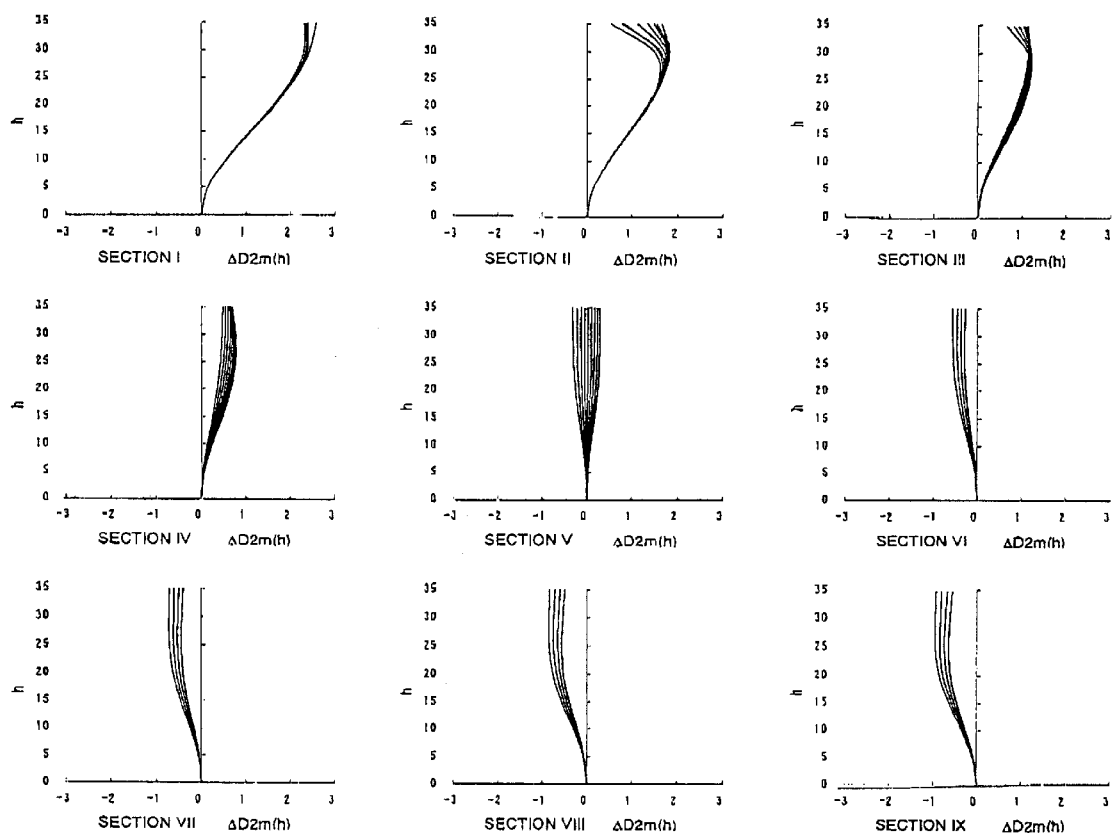
FIG. 6 shows graphs of variations of back surface powers ΔD2m(h) of finished lenses of respective sections in cross-section containing the optical axis according to the spectacle lens series of the second embodiment.

In a second embodiment, the front surface is a spherical surface that is common to the lenses in the specific section and the aspherical shape of the back surface is determined according to the required specification. The back surface powers D2m(h) of finished lenses in cross-section containing the optical axis according to the spectacle lens series of the second embodiment are shown in FIG. 5. Further the variations of the back surface power ΔD2m(h) that is obtained by D2m(h)−D2m(0) are shown in FIG. 6. As shown in TABLE 2, the spectacle lens series of the second embodiment adopts slower base curves than the first embodiment to reduce the thickness of the spectacle lens.

With regard to the optical performance, the spectacle lens series of the second embodiment is designed such that the astigmatism for the infinite object distance and the astigmatism for the object distance 300 mm are well balanced.

Figure 7:
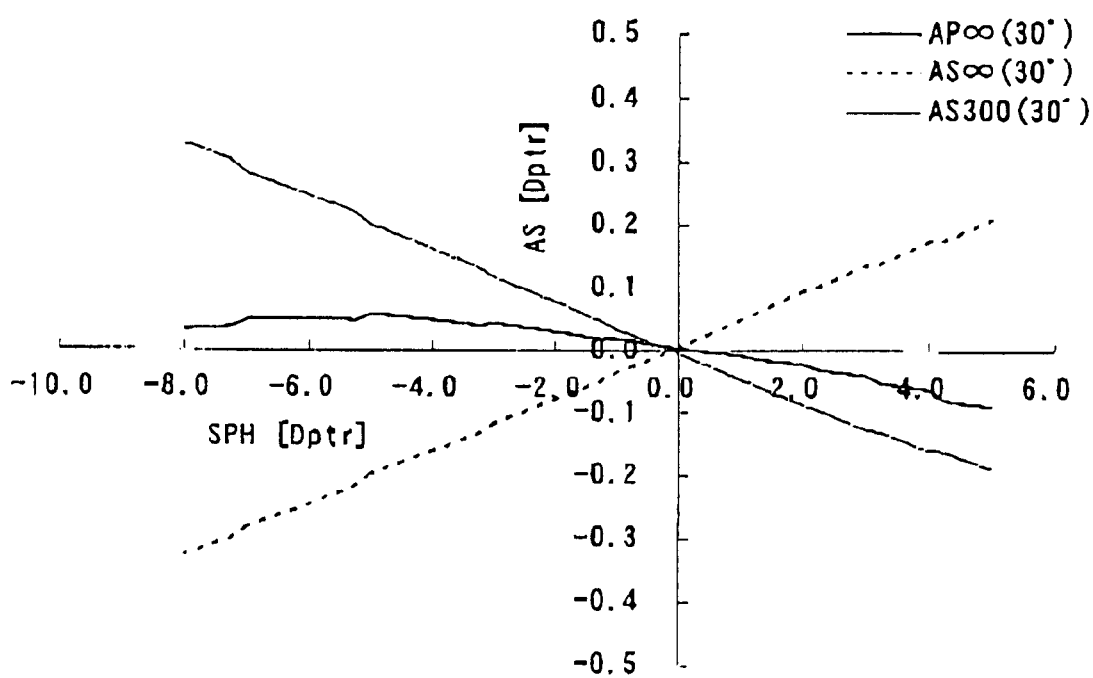
FIG. 7 is a graph showing optical performance of the spectacle lens series at 30 degrees in visual angle according to the second embodiment.

FIG. 7 shows the average power error $AP_\infty(30)$ for the infinite object distance, the astigmatism $AS_\infty(30)$ for the infinite object distance, and the astigmatism $AS_{300}(30)$ for the object distance 300 mm of the spectacle lens series according to the second embodiment within the entire range of vertex power SPH −8.00 D to +5.00 D. As shown in FIG. 7, the variations of the aberrations within each section are reduced and the degradations at boundaries of the section are also reduced. The astigmatisms $AS_\infty(30)$ and $AS_{300}(30)$ are well balanced over the entire range of vertex power.

Third Embodiment

Figure 8:
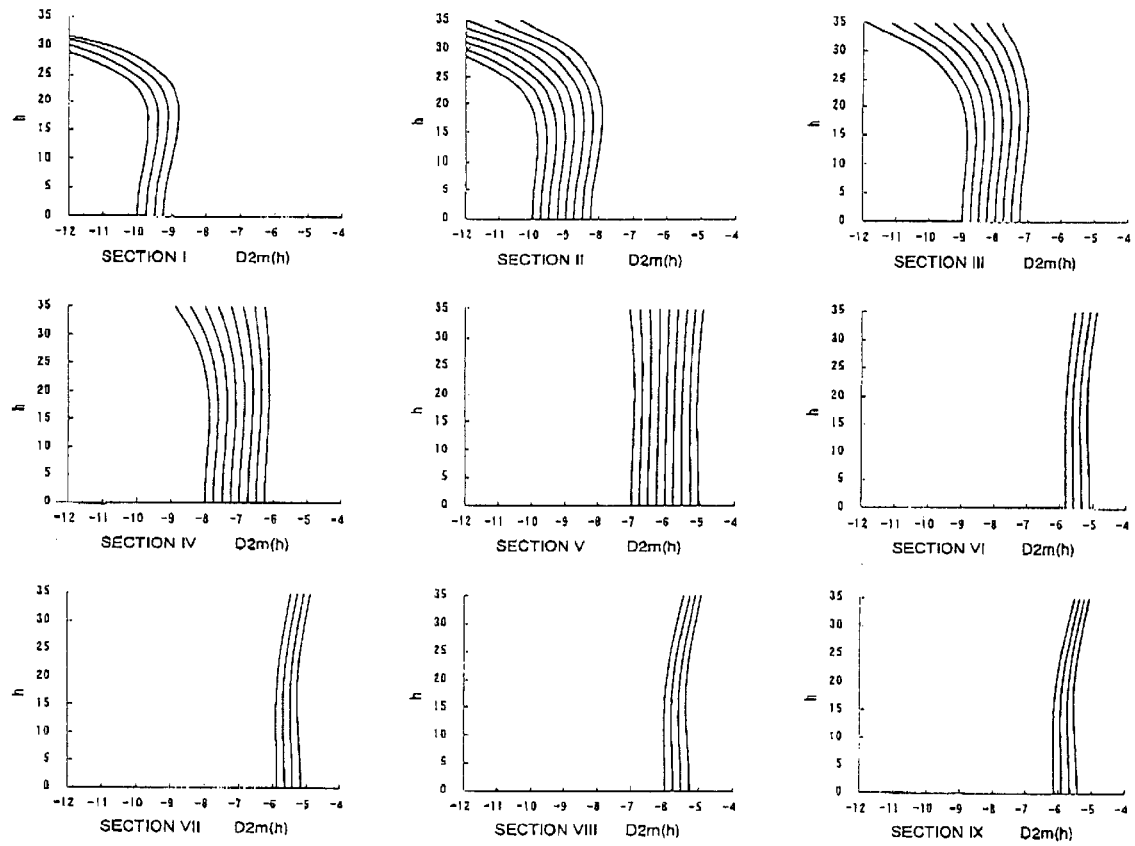
FIG. 8 shows graphs of back surface powers D2m(h) of finished lenses of respective sections in cross-section containing the optical axis according to a spectacle lens series of a third embodiment.
Figure 9:
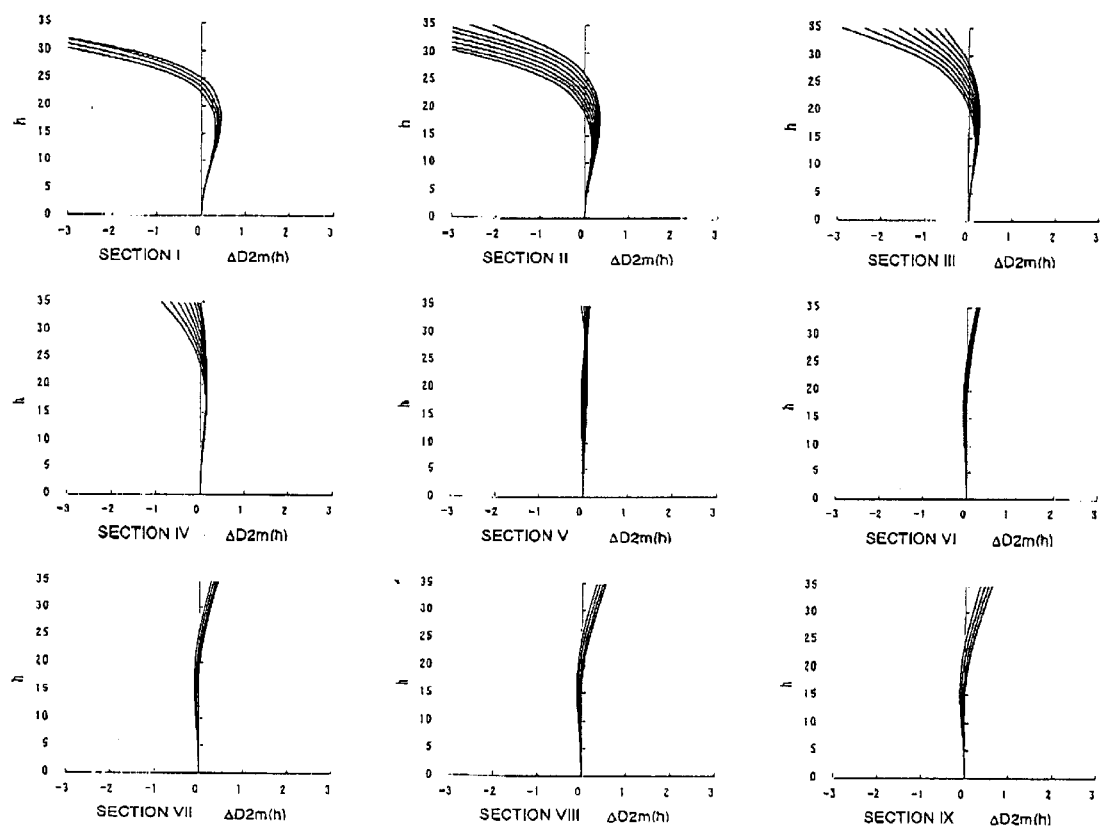
FIG. 9 shows graphs of variations of back surface powers ΔD2m(h) of finished lenses of respective sections in cross-section containing the optical axis according to the spectacle lens series of the third embodiment.

In a third embodiment, the front surface is a spherical surface that is common to the lenses in the specific section and the aspherical shape of the back surface is determined according to the required specification. The back surface powers D2m(h) of finished lenses in cross-section containing the optical axis according to the spectacle lens series of the third embodiment are shown in FIG. 8. Further the variations of the back surface power ΔD2m(h) that is obtained by D2m(h)−D2m(0) are shown in FIG. 9. As shown in TABLE 2, the spectacle lens series of the third embodiment adopts sharper base curves than the first embodiment to reduce the variation of the optical performance.

With regard to the optical performance, the spectacle lens series of the third embodiment is designed such that the astigmatism for the infinite object distance and the astigmatism for the object distance 300 mm are well balanced.

Figure 10:
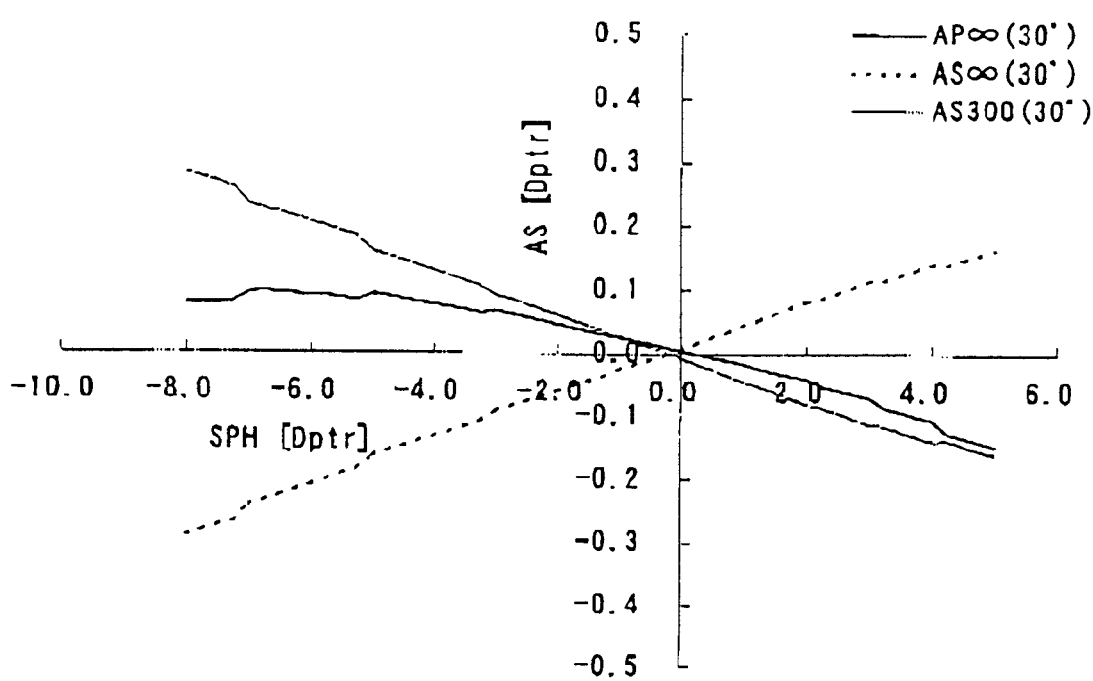
FIG. 10 is a graph showing optical performance of the spectacle lens series at 30 degrees in visual angle according to the third embodiment.

FIG. 10 shows the average power error $AP_\infty(30)$ for the infinite object distance, the astigmatism $AS_\infty(30)$ for the infinite object distance, and the astigmatism $AS_{300}(30)$ for the object distance 300 mm of the spectacle lens series according to the third embodiment within the entire range of vertex power SPH −8.00 D to +5.00 D. As shown in FIG. 10, the variations of the aberrations within each section are reduced and the degradations at boundaries of the section are also reduced. The astigmatisms $AS_\infty(30)$ and $AS_{300}(30)$ are well balanced over the entire range of vertex power.

Fourth Embodiment

Figure 11:
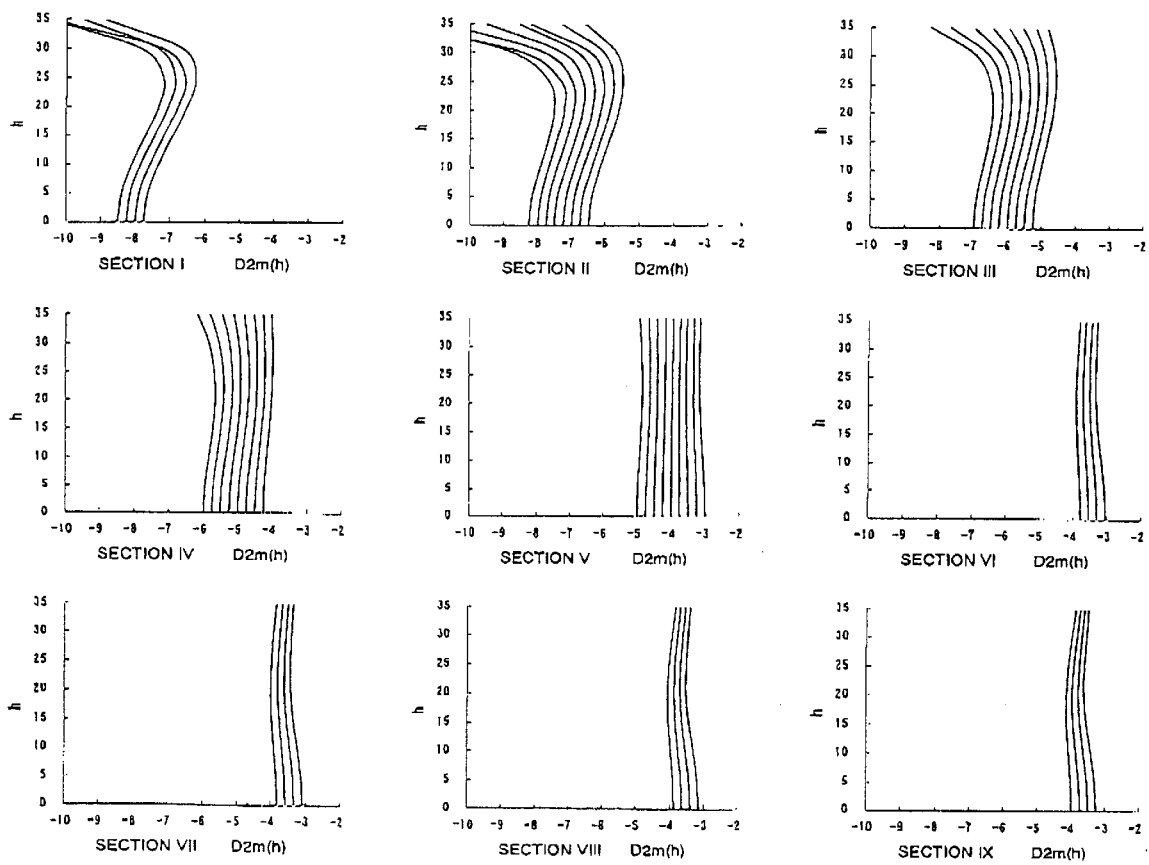
FIG. 11 shows graphs of back surface powers D2m(h) of finished lenses of respective sections in cross-section containing the optical axis according to a spectacle lens series of a fourth embodiment.
Figure 12:
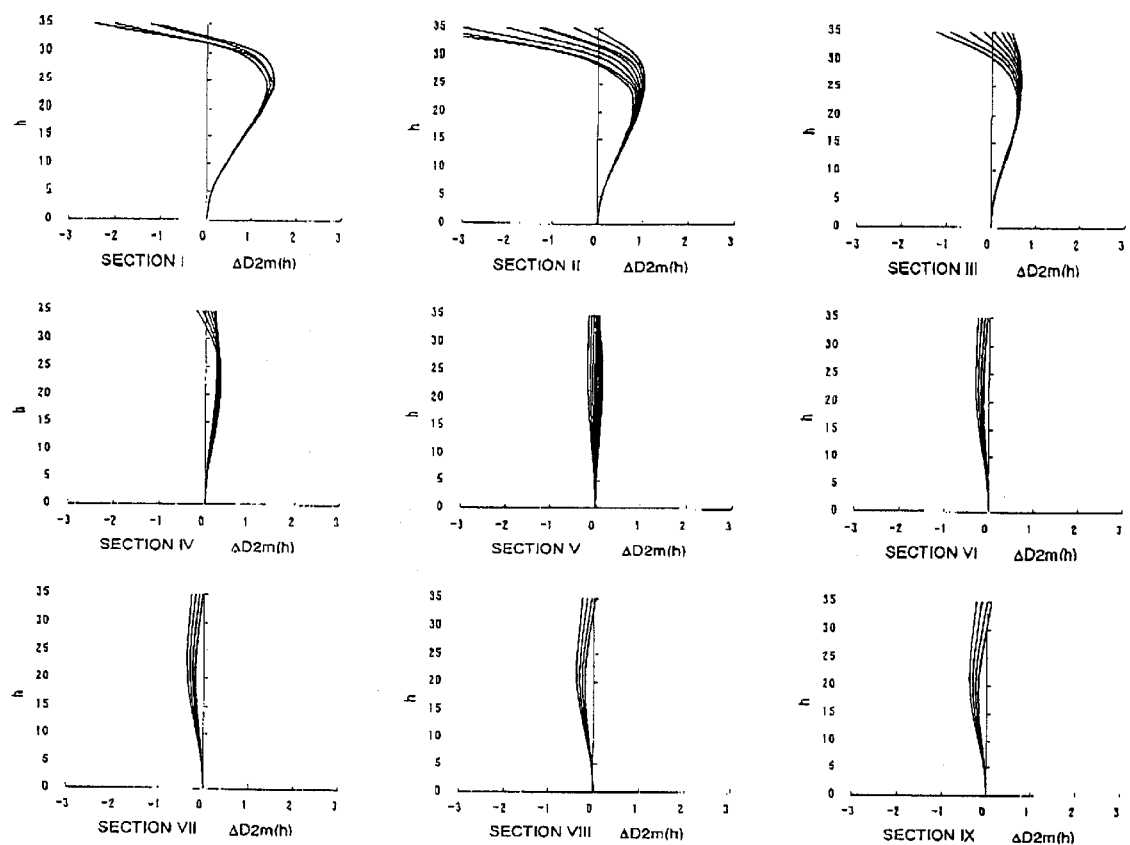
FIG. 12 shows graphs of variations of back surface powers ΔD2m(h) of finished lenses of respective sections in cross-section containing the optical axis according to the spectacle lens series of the fourth embodiment.

In a fourth embodiment, the front surface is a spherical surface that is common to the lenses in the specific section and the aspherical shape of the back surface is determined according to the required specification. The back surface powers D2m(h) of finished lenses in cross-section containing the optical axis according to the spectacle lens series of the fourth embodiment are shown in FIG. 11. Further the variations of the back surface power ΔD2m(h) that is obtained by D2m(h)−D2m(0) are shown in FIG. 12.

With regard to the optical performance, the spectacle lens series of the fourth embodiment is designed such that the average power error for the infinite object distance is well corrected.

Figure 13:
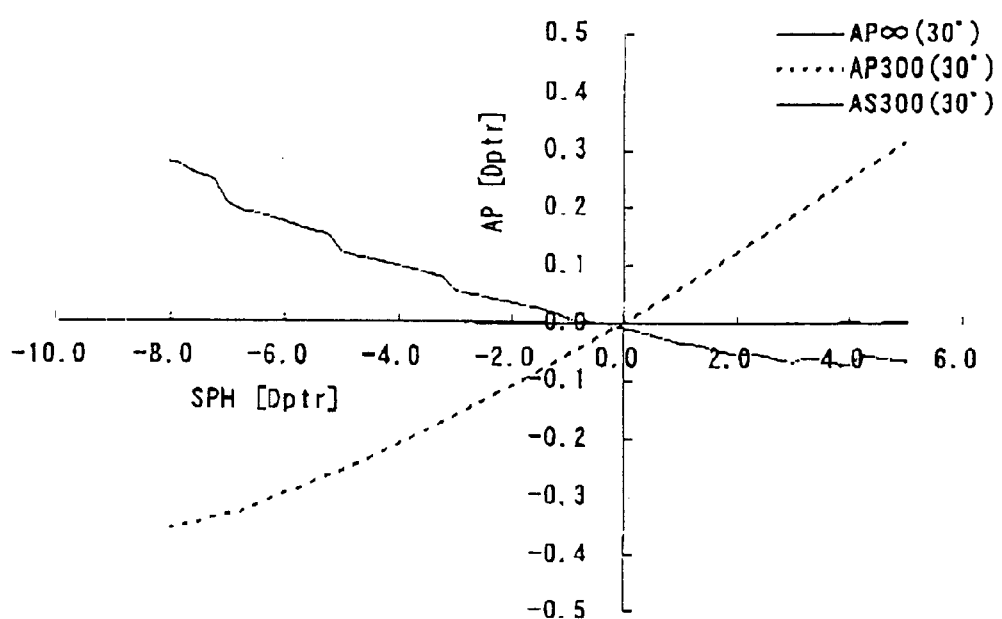
FIG. 13 is a graph showing optical performance of the spectacle lens series at 30 degrees in visual angle according to the fourth embodiment.

FIG. 13 shows the average power error $AP_\infty(30)$ for the infinite object distance, the astigmatism $AS_\infty(30)$ for the infinite object distance, and the astigmatism $AS_{300}(30)$ for the object distance 300 mm of the spectacle lens series according to the fourth embodiment within the entire range of vertex power SPH −8.00 D to +5.00 D. As shown in FIG. 13, the variations of the aberrations within each section are reduced and the degradations at boundaries of the section are also reduced. The average power error $AP_\infty(30)$ becomes nearly zero over the entire range of vertex power.

Fifth Embodiment

Figure 14:
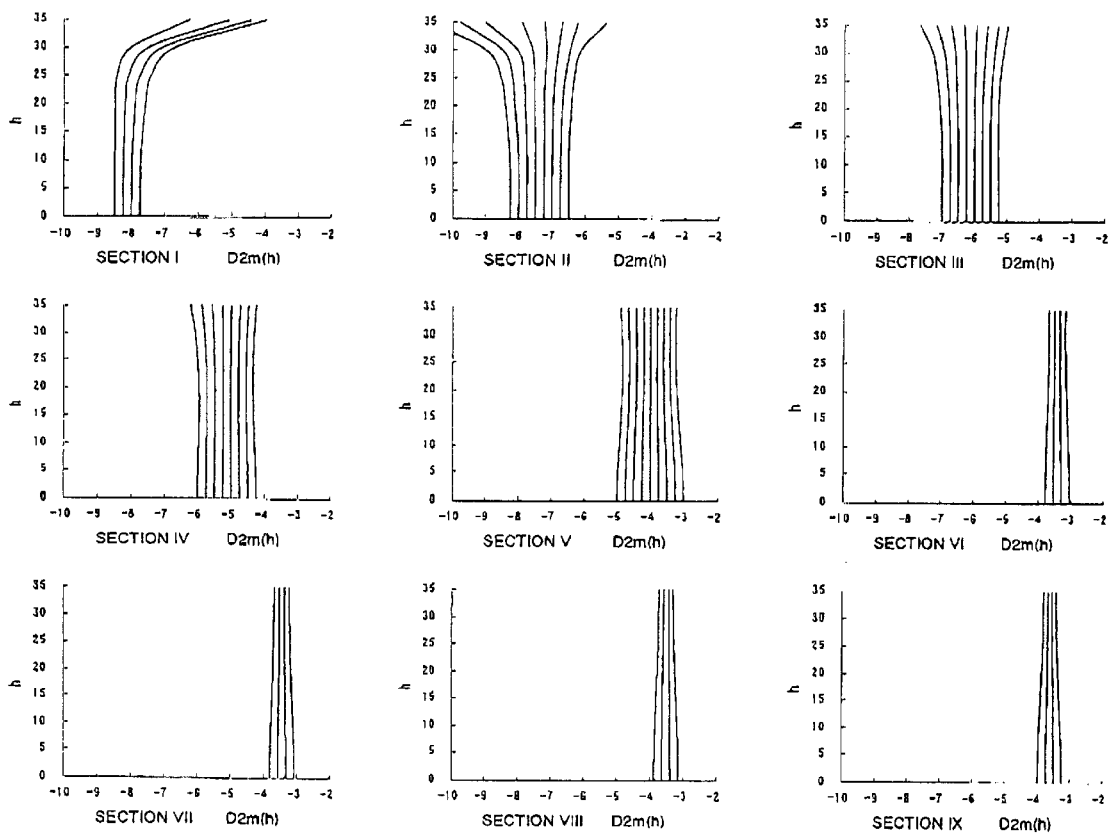
FIG. 14 shows graphs of back surface powers D2m(h) of finished lenses of respective sections In cross-section containing the optical axis according to a spectacle lens series of a fifth embodiment.
Figure 15:
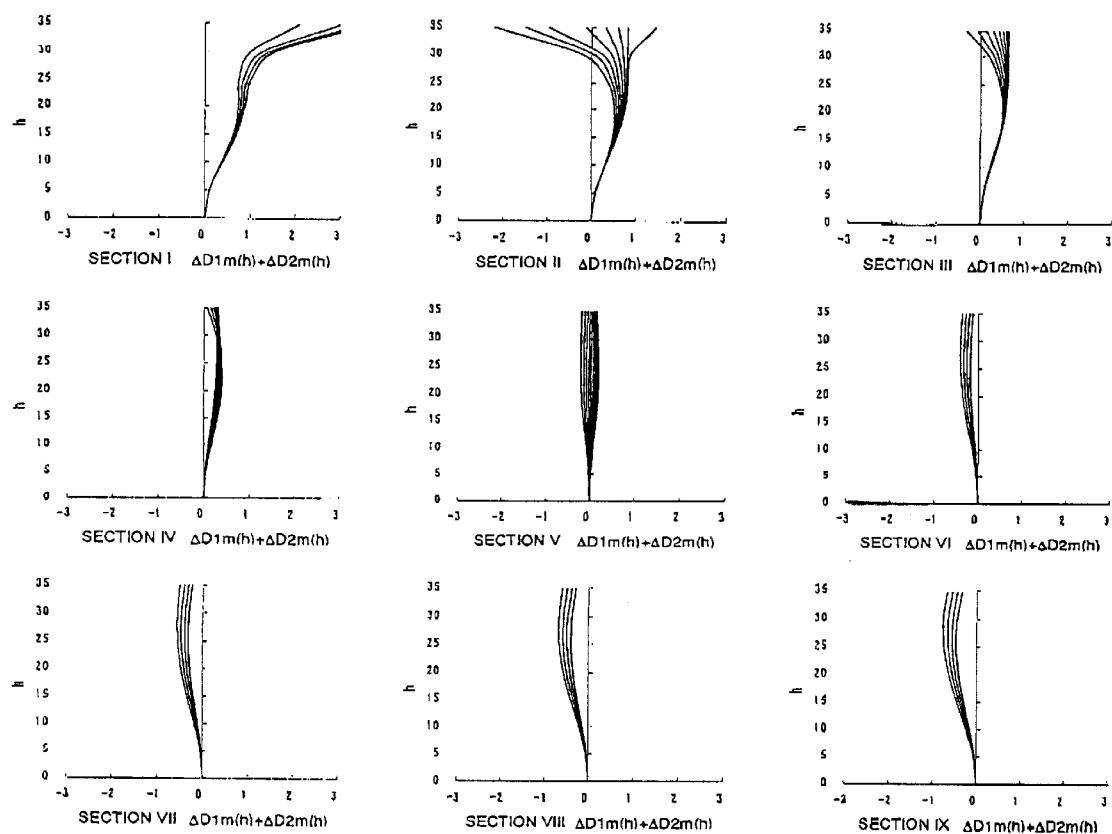
FIG. 15 shows graphs of the sum of the variations of the front and back surface powers ΔD1m(h)+ΔD2m(h) of finished lenses of respective sections in cross-section containing the optical axis according to the spectacle lens series of the fifth embodiment.
Figure 18:
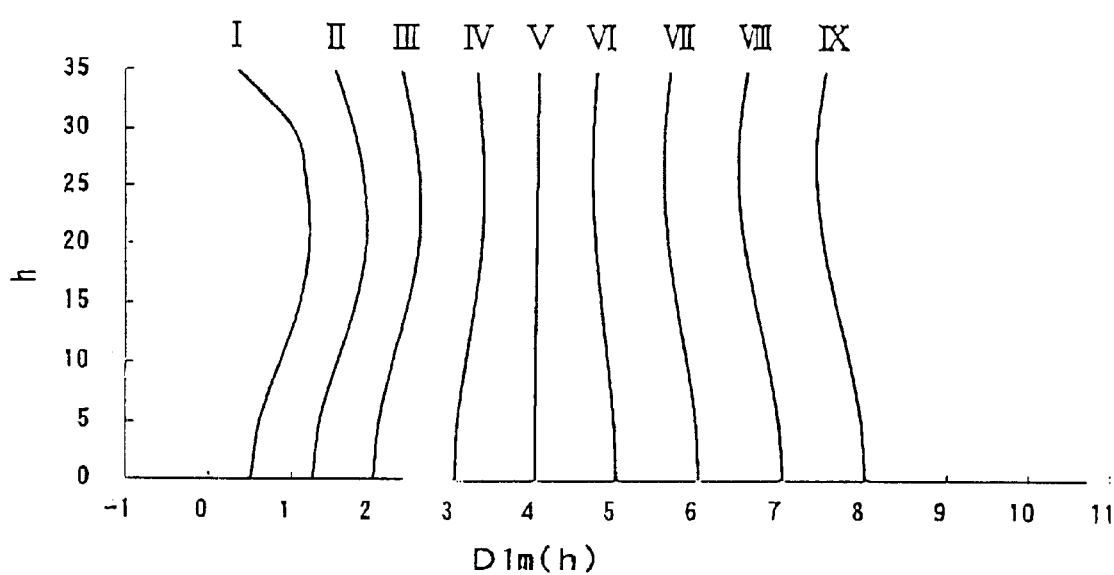
FIG. 18 shows graphs of front surface powers ΔD1m(h) of finished lenses of respective sections in cross-section containing the optical axis according to a conventional spectacle lens series.
Figure 19:
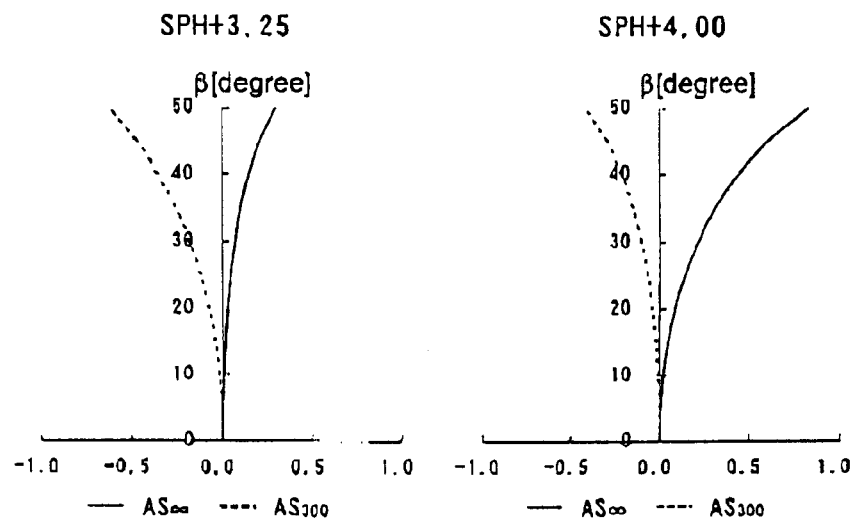
FIG. 19 shows graphs of astigmatisms with respect to the visual angle β of the conventional spectacle lenses whose required vertex powers are SPE +3.25 D and +4.00 D.
Figure 20:
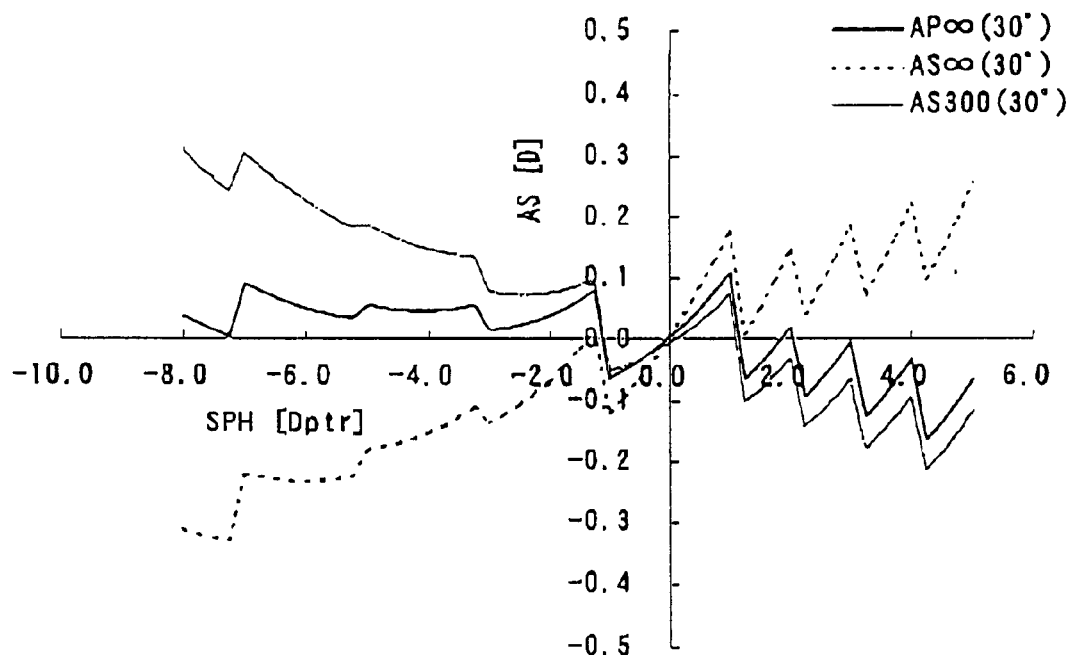
FIG. 20 is a graph showing optical performance of the conventional spectacle lens series at 30 degrees in visual angle.

In a fifth embodiment, the front surface is an aspherical surface that is common to the lenses in the specific section and the aspherical shape of the back surface is determined according to the required specification. The aspherical shapes of the front surfaces of the respective sections are identical to those of the prior art shown in FIG. 18. The back surface powers D2m(h) of finished lenses in cross-section containing the optical axis according to the spectacle lens series of the fifth embodiment are shown in FIG. 14. Further the sum of the variations of the front and back surface power ΔD1m(h)+ΔD2m(h) are shown in FIG. 15.

With regard to the optical performance, the spectacle lens series of the fifth embodiment is designed such that the astigmatism for the infinite object distance and the astigmatism for the object distance 300 mm are well balanced.

Figure 16:
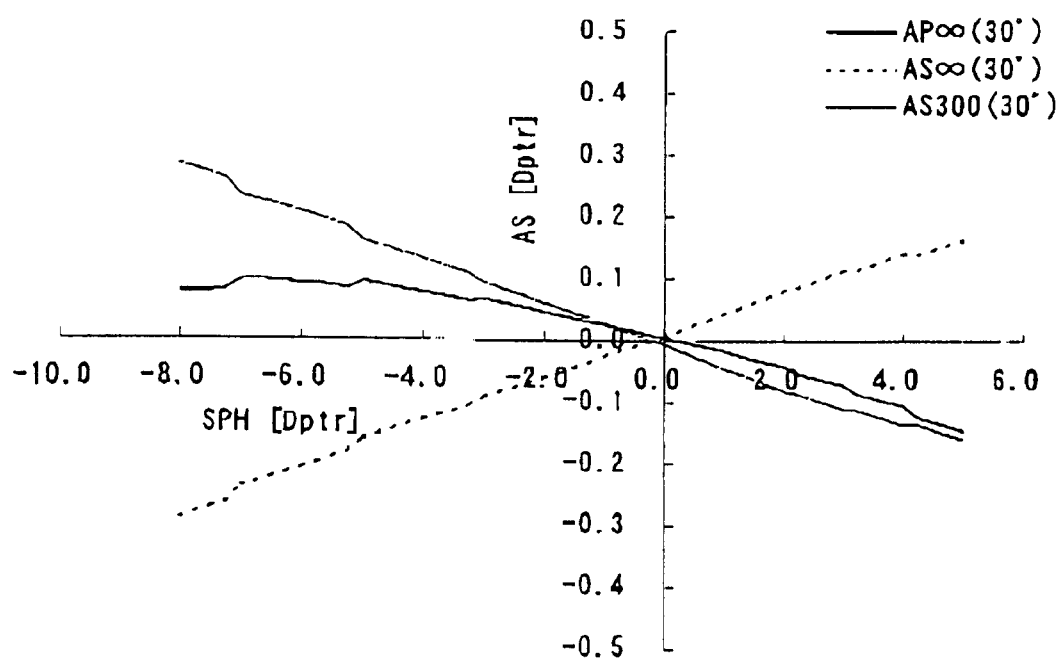
FIG. 16 is a graph showing optical performance of the spectacle lens series at 30 degrees in visual angle according to the fifth embodiment.

FIG. 16 shows the average power error $AP_\infty(30)$ for the infinite object distance, the astigmatism $AS_\infty(30)$ for the infinite object distance, and the astigmatism $AS_{300}(30)$ for the object distance 300 mm of the spectacle lens series according to the fifth embodiment within the entire range of vertex power SPH −8.00 D to +5.00 D. As shown in FIG. 16, the variations of the aberrations within each section are reduced and the degradations at boundaries of the section are also reduced. The astigmatisms $AS_\infty(30)$ and $AS_{300}(30)$ are well balanced over the entire range of vertex power.

Next, the values of the conditions (1) to (9) with respect to the spectacle lens series of the embodiments and the prior art will be described. In the following TABLEs 3 to 11, "yes" means that the spectacle lens series satisfies the corresponding condition and "no" means that it does not satisfy the corresponding condition. The rightmost column indicates a basis of judgement.

TABLE 3

Condition (1) $\Delta D1m(h)_i + \Delta D2m(h)_i \neq \Delta D1m(h)_j + \Delta D2m(h)_j$
(at a specific height h within the range of 0 < h < 15)

| | | |
|---|---|---|
| Ex. 1 | YES | Evident from FIG. 3 |
| Ex. 2 | YES | Evident from FIG. 6 |
| Ex. 3 | YES | Evident from FIG. 9 |
| Ex. 4 | YES | Evident from FIG. 12 |
| Ex. 5 | YES | Evident from FIG. 15 |
| Prior Art | NO | Front surface is common and back surface is spherical. Left part equals right part. |

TABLE 4

Condition (2) $D1m(h)_i = D1m(h)_j$

| | | |
|---|---|---|
| Ex. 1 | YES | Front surface is common. |
| Ex. 2 | YES | Front surface is common. |
| Ex. 3 | YES | Front surface is common. |
| Ex. 4 | YES | Front surface is common. |
| Ex. 5 | YES | Front surface is common. |
| Prior Art | YES | Front surface is common. |

TABLE 5

Condition (3) $D1m(h)_i = D1m(h)_j = D1m(0)_i = D1m(0)_j$

| | | |
|---|---|---|
| Ex. 1 | YES | Front surface is spherical. |
| Ex. 2 | YES | Front surface is spherical. |
| Ex. 3 | YES | Front surface is spherical. |
| Ex. 4 | YES | Front surface is spherical. |
| Ex. 5 | NO | Front surface is aspherical. |
| Prior Art | NO | Front surface is aspherical. |

TABLE 6

Condition (4) $MAX(|\Delta D1m(h)_1 + \Delta D2m(h)_i - \Delta D1m(h)_j - \Delta D2m(h)_j|) \leq 0.3$ (when $P_i < P_j < -3.00$ and $h \leq 15$)

| | | |
|---|---|---|
| Ex. 1 | YES | Evident from FIG. 3 (0.058) |
| Ex. 2 | YES | Evident from FIG. 6 (0.118) |
| Ex. 3 | YES | Evident from FIG. 9 (0.179) |
| Ex. 4 | YES | Evident from FIG. 12 (0.062) |
| Ex. 5 | YES | Evident from FIG. 15 (0.090) |
| Prior Art | YES | Front surface is common and back surface is spherical. |

TABLE 7

Condition (5) $\Delta D1m(15)_i + \Delta D2m(15)_i < D1m(15)_j + \Delta D2m(15)_j$ (when $P_i > P_j > +2.00$)

| | | |
|---|---|---|
| Ex. 1 | YES | Evident from FIG. 3 |
| Ex. 2 | YES | Evident from FIG. 6 |
| Ex. 3 | YES | Evident from FIG. 9 |
| Ex. 4 | YES | Evident from FIG. 12 |
| Ex. 5 | YES | Evident from FIG. 15 |
| Prior Art | NO | Front surface is common and back surface is spherical. |

TABLE 8

$$\text{Condition}(6) - 0.04 < \frac{AS_\infty(\beta)_i + AS_{300}(\beta)_i - AS_\infty(\beta)_j - AS_{300}(\beta)_j}{2(P_i - P_j)} < 0.04$$

(when $P_i < P_j$ and $\beta \leq 30$)

| | | |
|---|---|---|
| Ex. 1 | YES | −0.002 to 0.006 |
| Ex. 2 | YES | −0.002 to 0.006 |
| Ex. 3 | YES | −0.006 to 0.006 |
| Ex. 4 | YES | −0.024 to 0.026 |
| Ex. 5 | YES | −0.006 to 0.006 |
| Prior Art | NO | −0.064 to 0.184 |

TABLE 9

$$\text{Condition}(7) - 0.01 < \frac{AS_\infty(\beta) + AS_{300}(\beta)}{2} < 0.1$$

(when $62 \leq 30$)

| | | |
|---|---|---|
| Ex. 1 | YES | −0.002 to 0.007 |
| Ex. 2 | YES | −0.001 to 0.010 |
| Ex. 3 | YES | −0.004 to 0.003 |
| Ex. 4 | NO | −0.070 to 0.126 |
| Ex. 5 | YES | −0.004 to 0.003 |
| Prior Art | NO | −0.086 to 0.125 |

TABLE 10

$$\text{Condition}(8) - 0.04 < \frac{AP_\infty(\beta)_i - AP_\infty(\beta)_j}{P_i - P_j} < 0.04$$

(when $P_i < P_j$ and $\beta \leq 30$)

| | | |
|---|---|---|
| Ex. 1 | YES | −0.020 to 0.008 |
| Ex. 2 | YES | −0.016 to 0.008 |
| Ex. 3 | YES | −0.028 to 0.012 |
| Ex. 4 | YES | −0.004 to 0.004 |
| Ex. 5 | YES | −0.028 to 0.012 |
| Prior Art | NO | −0.048 to 0.144 |

TABLE 11

Condition (9) $-0.1 < AP_\infty(\beta) < 0.1$
(when $\beta \leq 30$)

| | | |
|---|---|---|
| Ex. 1 | NO | −0.108 to 0.067 |
| Ex. 2 | YES | −0.090 to 0.057 |
| Ex. 3 | NO | −0.146 to 0.097 |
| Ex. 4 | YES | −0.002 to 0.003 |
| Ex. 5 | NO | −0.146 to 0.097 |
| Prior Art | NO | −0.165 to 0.108 |

The present disclosure relates to the subject matters contained in Japanese Patent Applications No 2000-206720, filed on Jul. 7, 2000 which is expressly incorporated herein by reference in its entirety.

What is claimed is:

1. A designing method of a spectacle lens whose at least one of front and back surfaces that is aspherical, comprising:
   dividing the entire range of available vertex power of a spectacle lens into a plurality of sections;
   preparing at least one type of semifinished lens blank for each of said sections, said semifinished lens blank having one of said front and back surfaces that is finished, and the other of said front and back surfaces that is unfinished;
   selecting one type of said semifinished lens blank according to a required specification;
   determining an aspherical shape design for processing the unfinished surface of the selected semifinished lens blank to be optimized for said required specification.

2. The designing method according to claim 1, wherein the front surface of said semifinished lens blank is finished.

3. The designing method according to claim 2, wherein said front surface is a spherical surface.

4. The designing method according to claim 2, wherein said front surface is an aspherical surface.

5. The designing method according to claim 1, wherein said aspherical shape design for processing the unfinished surface is optimized such that average power errors or astigmatisms of the finished lenses having different vertex powers within the same section are approximately balanced.

6. The designing method according to claim 1, wherein said aspherical shape design for processing the unfinished surface is optimized such that any pair of the finished lenses that have different vertex powers within the same section satisfy the following condition (1) for at least one height h within the range of 0<h<15:

$$\Delta D1m(h)_i + \Delta D2m(h)_i \neq \Delta D1m(h)_j + \Delta D2m(h)_j \qquad (1)$$

where

D1m(h) and D2m(h) are surface powers of the front and back surfaces (unit: diopter) at the point whose distance from the optical axis of said finished lens is h (unit: mm) in a plane that contains said optical axis, $\Delta D1m(h)$ is a variation of surface power of the front surface and is obtained by D1m(h)−D1m(0), $\Delta D2m(h)$ is a variation of surface power of the back surface and is obtained by D2m(h)−D2m(0), and the subscripts "i" and "j" represent the values of the finished lenses that have different vertex powers within the same section.

7. The designing method according to claim 6, further satisfying the following condition (2):

$$D1m(h)_i = D1m(h)_j. \qquad (2)$$

8. The designing method according to claim 7, further satisfying the following condition (3):

$$D1m(h)_i = D1m(h)_j = D1m(0)_i = D1m(0)_j. \qquad (3)$$

9. The designing method according to claim 6, further satisfying the condition (4) when $P_i < P_j < -3.00$ and $h \leq 15$:

$$\text{MAX}(|\Delta D1m(h)_i + \Delta D2m(h)_i - \Delta D1m(h)_j - \Delta D2m(h)_j|) \leq 0.3 \qquad (4)$$

where

P is a vertex power (unit: diopter); and

MAX( ) is a function that finds the maximum value in the specific section.

10. The designing method according to claim 6, further satisfying the condition (5) when $P_i > P_j > +2.00$:

$$\Delta D1m(15)_i + \Delta D2m(15)_i < \Delta D1m(15)_j + \Delta D2m(15)_j \qquad (5)$$

where

P is a vertex power (unit: diopter).

11. The designing method according to claim 6, further satisfying the condition (6) when $P_i < P_j$ and $\beta \leq 30$:

$$-0.04 < \frac{AS_\infty(\beta)_i + AS_{300}(\beta)_1 - AS_\infty(\beta)_j - AS_{300}(\beta)_j}{2(P_i - P_j)} < 0.04 \qquad (6)$$

where

P is a vertex power (unit: diopter);

$AS_\infty(\beta)$ is astigmatism (unit: diopter) at visual angle $\beta$ (unit: degree) for infinite object distance; and $AS_{300}(\beta)$ is astigmatism at visual angle $\beta$ for object distance 300 mm.

12. The designing method according to claim 6, further satisfying the following condition (7) when $\beta \leq 30$:

$$-0.01 < \frac{AS_\infty(\beta) + AS_{300}(\beta)}{2} < 0.1 \qquad (7)$$

where $AS_\infty(\beta)$ is astigmatism (unit: diopter) at visual angle $\beta$ (unit: degree) for infinite object distance; and $AS_{300}(\beta)$ is astigmatism at visual angle $\beta$ for object distance 300 mm.

13. The designing method according to claim 6, further satisfying the condition (8) when $P_i < P_j$ and $\beta \leq 30$:

$$-0.04 < \frac{AP_\infty(\beta)_1 - AP_\infty(\beta)_j}{P_i - P_j} < 0.04 \qquad (8)$$

where

P is a vertex power (unit: diopter); and $AP_\infty(\beta)$ is average power error at visual angle $\beta$ (unit: degree) for infinite object distance.

14. The designing method according to claim 6, further satisfying the condition (9) when $\beta \leq 30$:

$$-0.1 < AP_\infty(\beta) < 0.1 \qquad (9)$$

where $AP_\infty(\beta)$ is average power error at visual angle $\beta$ (unit: degree) for infinite object distance.

15. The designing method according to claim 1, wherein said aspherical shape design for processing the unfinished surface is optimized such that relationships between average power errors or astigmatisms of each finished lens within the same section are substantially the same.

16. A manufacturing method of a spectacle lens having at least one of front and back surfaces that is aspherical, comprising:

dividing the entire range of available vertex power of a spectable lens into a plurality of sections;

preparing at least one type of semifinished lens blank for each of said sections, said semifinished lens blank having a front surface that is finished and a back surface that is unfinished;

selecting one type of said semifinished lens blank according to a required specification for the spectacle lens;

processing the unfinished back surface of the selected semifinished lens blank into an asperical surface to form a finished lens according to the required specification for the spectacle lens.

17. The manufacturing method according to claim 16, wherein the front surface of said semifinished lens blank is a spherical surface.

18. A spectacle lens series comprising:

a plurality of types of spectacle lenses that are different in vertex power, wherein one of front and back surfaces of each spectacle lens is predetermined for each of a plurality of sections into which the entire range of available vertex power is divided, and the other of said front and back surfaces is an aspherical surface determined for a required specification, and wherein said spectacle lenses that have different vertex powers within the same section satisfy the following condition (1) for at least one height h within the range of 0<h<15:

$$\Delta D1m(h)_i + \Delta D2m(h)_i \neq \Delta D1m(h)_j + \Delta D2m(h)_j \qquad (1)$$

where $D1m(h)$ and $D2m(h)$ are surface powers of the front and back surfaces (unit: diopter) at the point whose distance from the optical axis of said spectacle lens is h (unit: mm) in a plane that contains said optical axis, $\Delta D1m(h)$ is a variation of surface power of the front surface and is obtained by $D1m(h) - D1m(0)$, $\Delta D2m(h)$ is a variation of surface power of the back surface and is obtained by $D2m(h) - D2m(0)$, and the subscripts "i" and "j" represent the values of the spectacle lenses that have different vertex powers within the same section.

19. The spectacle lens series according to claim 18, wherein said front surfaces of said spectacle lenses are predetermined for each of said sections.

20. The spectacle lens series according to claim 19, wherein said front surfaces of said spectacle lenses are spherical surfaces.

* * * * *